US007402745B2

(12) United States Patent
Okada

(10) Patent No.: US 7,402,745 B2
(45) Date of Patent: Jul. 22, 2008

(54) MIDI PLAYING METHOD

(75) Inventor: Toshiharu Okada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 212 days.

(21) Appl. No.: 11/261,767

(22) Filed: Oct. 31, 2005

(65) Prior Publication Data

US 2006/0201314 A1 Sep. 14, 2006

(30) Foreign Application Priority Data

Mar. 8, 2005 (JP) ............................ 2005-064452

(51) Int. Cl.
*G01H 7/00* (2006.01)

(52) U.S. Cl. ........................................................ 84/645

(58) Field of Classification Search .................... 84/645
See application file for complete search history.

(56) References Cited

U.S. PATENT DOCUMENTS 5,974,015 A * 10/1999 Iizuka et al. .................. 386/96
2004/0069120 A1* 4/2004 Muraki ........................ 84/609

FOREIGN PATENT DOCUMENTS

JP 06-242788 9/1994

* cited by examiner

*Primary Examiner*—Jeffrey Donels
(74) *Attorney, Agent, or Firm*—Rabin & Berdo, P.C.

(57) ABSTRACT

The present invention provides a MIDI playing method comprising the steps of when synchronous event messages embedded in MIDI data are detected on the sequencer side which analyzes MIDI data in order along a time series of the MIDI data where the MIDI data are analyzed from the head of music to carry out MIDI musical performance, accumulating the number of the synchronous event messages and requesting a host CPU to make interrupt processing; and executing synchronous event processing on the host CPU side having received the request for the interrupt processing therein until the number of executed synchronous events and the accumulated value coincide with each other.

6 Claims, 3 Drawing Sheets

MIDI PLAYING METHOD

BACKGROUND OF THE INVENTION

The present invention relates to a playing method capable of synchronizing execution of an image display, lighting of an LED, the operation of a vibrator, and other functions applied between MIDIs and to devices, such as other sound playback with timings such as sound production of a given specific musical instrument, beats, a specified time, etc. during performances of MIDI music at a cellular phone, a personal digital assistant (PDA), a game machine, a MIDI device, etc.

An author ring device capable of simply processing data employed in a Karaoke machine using an electronic sound source based on the MIDI standard to synchronize music and an image, and titles and the like has been disclosed in a patent document 1 (Japanese Patent Laid-Open No. Hei 6(1994)-242788).

In a system equipped with a MIDI music playback device with a sequencer built therein, such as a cellular phone and a PDA, an interrupt from the MIDI music playback device to a host CPU has heretofore been generated to notify timing provided to synchronize music and each event with each other to the host CPU when the sequencer has received a synchronous message during the analysis of a MIDI message, using, as a method for synchronizing MIDI musical performance with other functions of the system, such as an image, a sound, etc. at other applications like Karaoke and games, a method for inserting a synchronous message in MIDI music in advance or a method for adding an extension message to MIDI music so as to be synchronized with sound production of a specific musical instrument.

The conventional method is accompanied by the problem that when a plurality of events occur simultaneously and synchronous events occur continuously, interrupt processing to the host CPU is not in time and interrupts overlap one another so that all the interrupts cannot be defected on the host CPU side, whereby the corresponding synchronous event is unexecuted and not in time for the next synchronism detection timing for originally executing another event.

Also, a problem arises in that when the executing order of events is specified in advance from the head of music, this cannot adapt to processing where musical performance is reproduced from the middle of music, and in order to properly execute each event in this case, the number of synchronous events taken till a playback start time at the middle of the music is held in advance, or the host CPU must count the number of event occurrences from the start of musical performance to the playback start time at the middle of the music by analyzing MIDI music in advance.

A conventional MIDI playing method will be explained using a flowchart shown in FIG. 3.

The MIDI music playback device performs sequencer processing for message-analyzing MIDI data inputted to an FIFO (data input memory) in order and carries out music playback processing in accordance with the analyzed message. When the message is found to be analyzed as the synchronous message in a MIDI message analysis processing step (S31), the MIDI music playback device performs processing for an interrupt request to the host CPU (S32) and returns to the sequencer processing.

When the host CPU accepts the interrupt request from the MIDI music playback device, it performs interrupt processing. The host CPU processes events (let's consider that assuming that event processes are executed in order in accordance with synchronous events from the start of music, files having designated the events are prepared in generating order) such as image descriptions and sound playback in designated order within the interrupt processing (S33) and terminates the interrupt processing.

When a plurality of new synchronous messages are processed in accordance with the sequencer processing on the MIDI music playback device side during the interrupt processing on the host CPU side, the host CPU cannot detect a new interrupt, so that there is a difference between the number of interrupt occurrences and the number of the synchronous messages, thus resulting in a shift in synchronous event.

SUMMARY OF THE INVENTION

An object of the present invention is to provide a MIDI playing method free of the occurrence of loss of synchronism between MIDI musical performance and event processing.

A typical MIDI playing method according to the present invention comprises the steps of when synchronous event messages embedded in MIDI data are detected on the sequencer side which analyzes MIDI data in order along a time series of the MIDI data where the MIDI data are analyzed from the head of music to carry out MIDI musical performance, accumulating the number of the synchronous event messages and requesting a host CPU to make interrupt processing; and executing synchronous event processing on the host CPU side having received the request for the interrupt processing therein until the number of executed synchronous events and the accumulated value coincide with each other.

In the MIDI playing method according to the present invention, when the synchronous event messages embedded in the MIDI data are detected, the interrupt request is made to the host CPU and the host CPU having accepted the interrupt request therein executes synchronous event processing until the number of the executed synchronous events and the accumulated value coincide with each other. Therefore, there is no loss of synchronism between the MIDI musical performance and the event processing.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

A preferred embodiment of the present invention will hereinafter be described with reference to the accompanying drawings. Incidentally, the respective figures are approximate illustrations to enable an understanding of the present invention.

Figure 2:
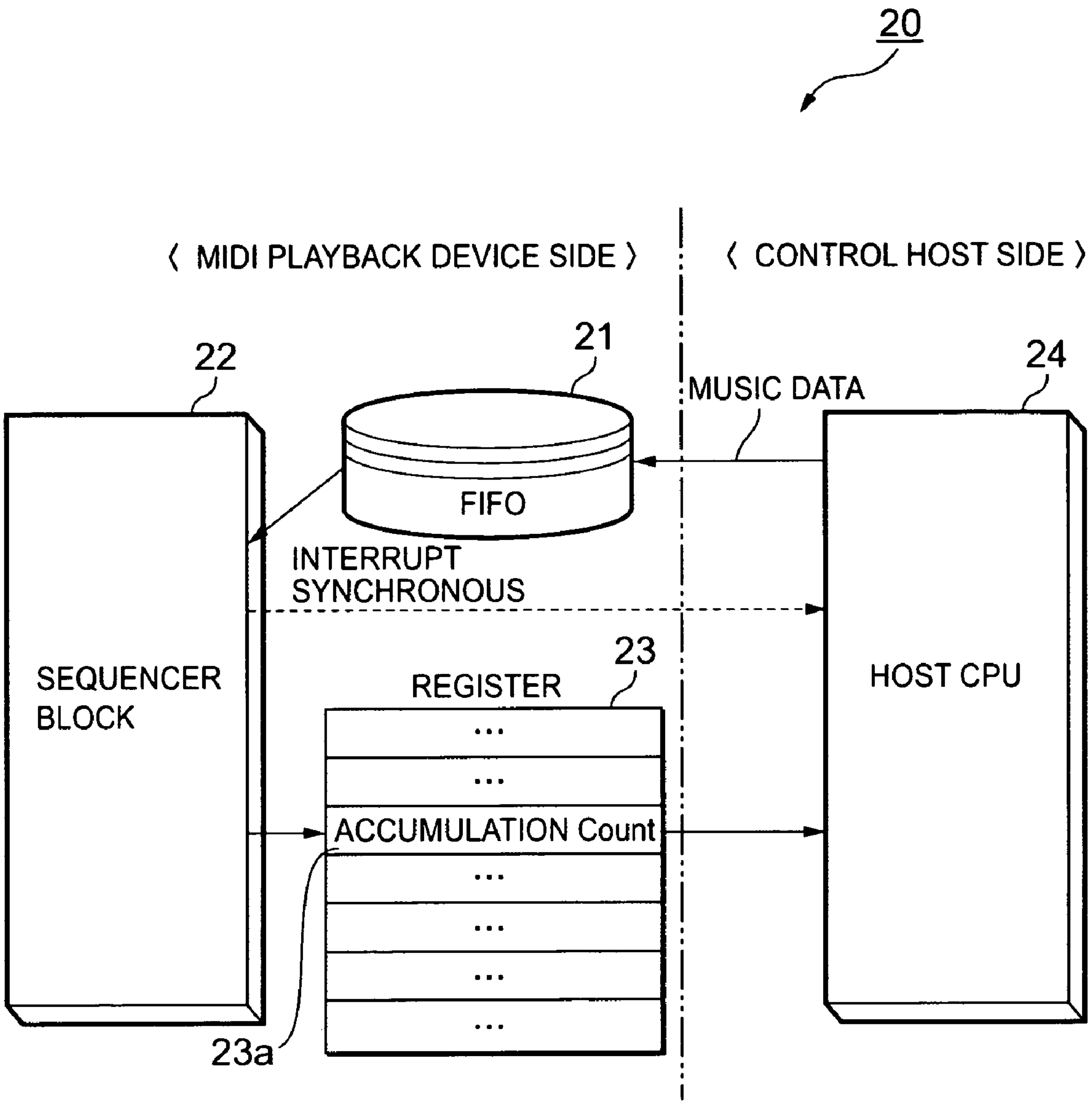
FIG. 2 is a schematic configuration diagram illustrating a system in which the MIDI playing method according to the present invention is implemented.
Figure 3:
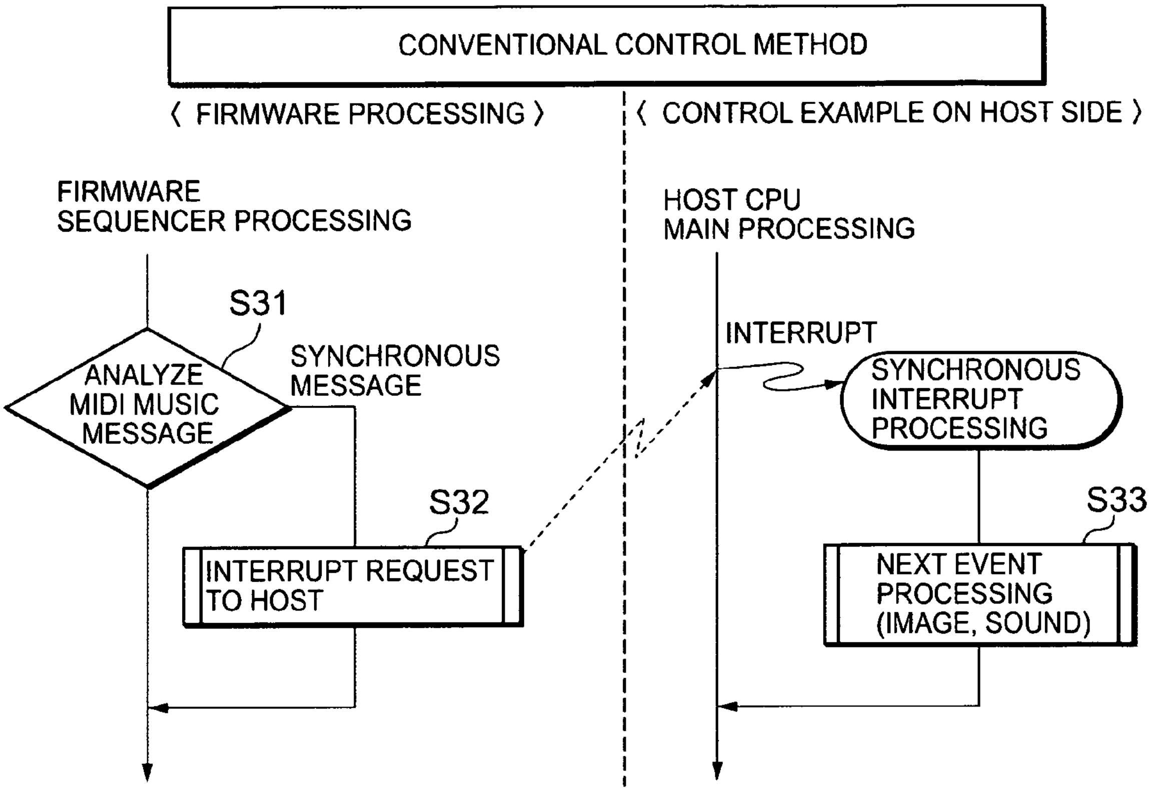
FIG. 3 is a flowchart showing a conventional MIDI playing method.

FIG. 2 is a schematic configuration diagram of a system in which a MIDI playing method according to the present invention is implemented. As basic constituents for realizing a method of the present invention, the present system 20 includes, on the MIDI device playback side, an FIFO memory 21 used as a music data input memory, a sequencer block 22 which performs sequencer processing, and a register 23 which performs the exchange of instructions, and includes a host CPU 24 on the control host side.

A message processed by the sequencer block is sent to a synthesizer block, where MIDI music is played. Also the host CPU (24) controls not only a MIDI playback device but also other functions (sound functions other than a screen display, LED control, vibrator control and MIDI).

When the MIDI music is played, the host CPU first transfers MIDI data to the FIFO memory 21. The sequencer block 22 message-analyzes the MIDI data written into the FIFO memory and transmits a play message to an unillustrated synthesizer, where the music is played.

When the message is analyzed as a synchronous message in the message analysis process of the sequencer block 22, an interrupt is made to the host CPU (24). The host CPU (24) executes an event with the generated interrupt signal as a trigger. At this time, the event process executed by the host CPU is referred to as "interrupt processing".

When a new synchronous interrupt occurs from the sequencer block to the host CPU (24) during interrupt processing, there was a possibility that the host CPU would fail to take the interrupt therein in the conventional method. In order to avoid it, accumulation counters 23*a* are provided in the register 23 in the present invention.

When a synchronous event is detected by the sequencer block 22, the sequencer block 22 allows the host CPU (24) to generate a synchronous interrupt at the same time when it adds 1 to the accumulation counters 23*a* (whose initial values are set to 0 at the head of music) of the register 23 one by one. The host CPU (24) receives the synchronous interrupt therein and performs its interrupt processing. When the host CPU exits the interrupt processing, it compares the value of each accumulation counter 23*a* of the register 23 and the number of events processed from the head of music and checks based on the result of comparison whether a new synchronous event takes place during the interrupt processing.

When the value of the accumulation counter 23*a* exceeds the number of the processed events, the host CPU executes events until it becomes equal to the value of the corresponding counter. Thereafter, the host CPU exits event processing. Thus, when the musical performance of music and the execution of each event are synchronized with the interrupt from the sequencer block to the host CPU as the trigger, the number of times the synchronous events have occurred is held in the corresponding accumulation counter 23*a*. Thus, the number of times that the event processing has been done is checked on the host CPU side, and the event processing can reliably be executed even where a plurality of events have occurred simultaneously and where the processing of the host CPU is slow and no interrupt is detected.

Figure 1:
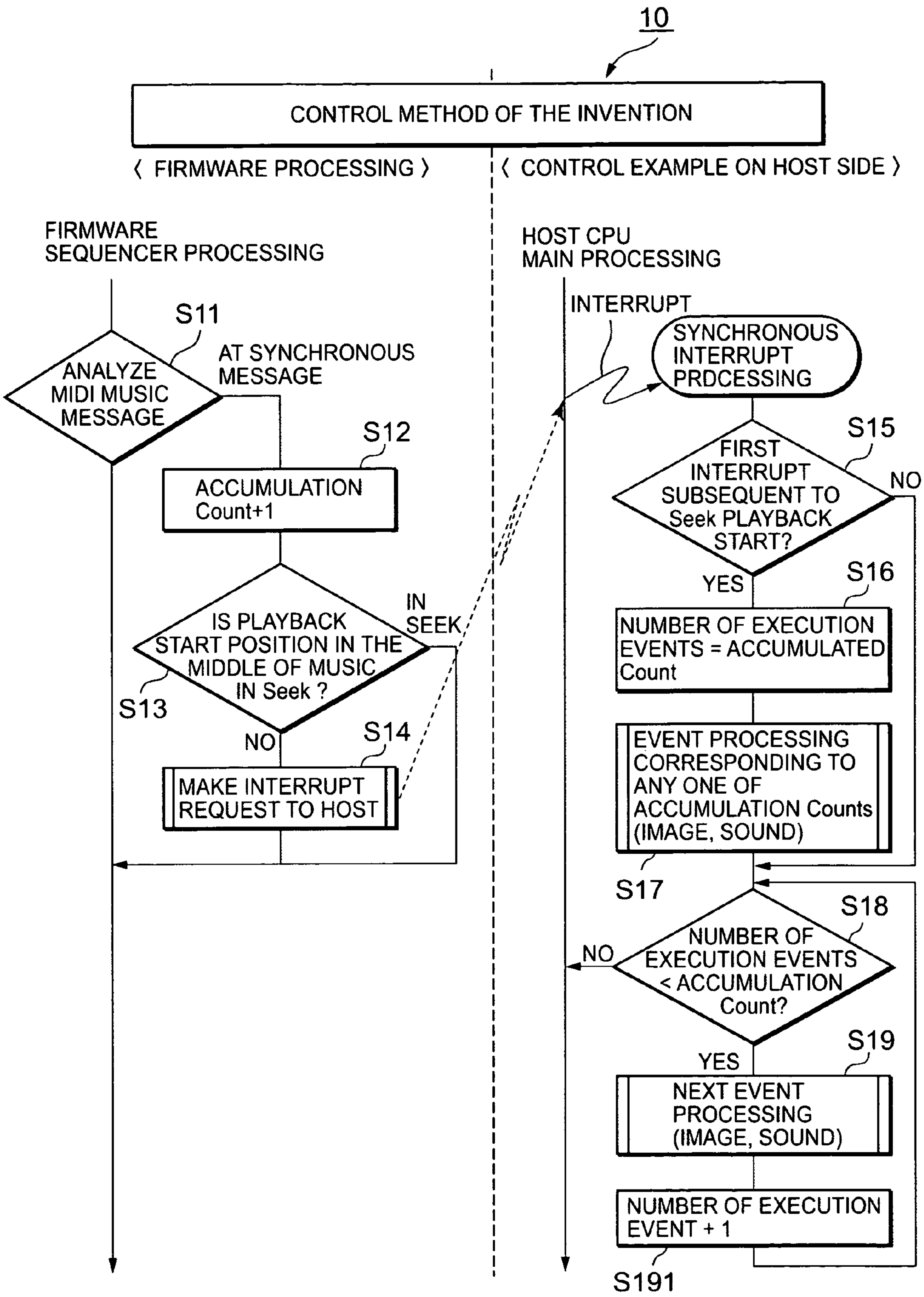
FIG. 1 is a flowchart showing a MIDI playing method according to an embodiment.

The MIDI playing method according to the present embodiment will hereinafter be explained in detail with reference to a flowchart shown in FIG. 1.

<Processing at Normal Playback (where Music is Played Back from the Head Thereof)>

Software (hereinafter called "firmware") built in the sequencer block 22 message-analyzes MIDI data of the FIFO memory in order and performs playback processing thereof. When, at this time, the firmware analyzes and processes a synchronous message in a MIDI message analysis process (S11), it increments the corresponding accumulation counter 23*a* by +1 (S12). Thereafter, the firmware confirms whether a playback start position at the middle of the music is in seek (S13). Since the playback start position is not in seek in the case of normal playback, the firmware makes an interrupt request to the host CPU (24) (S14) and returns to sequencer processing.

On the other hand, when the host CPU (24) receives the interrupt request from the firmware (S14), it performs interrupt processing. It is confirmed whether the interrupt processing is of a first interrupt processing subsequent to a seek playback start during the interrupt processing (S15). The function of seeking a designated point from the head of music by the sequencer block and starting its playback where playback is designated from midway through the music, is called "seek playback".

In the case of an interrupt at the normal playback, the host CPU proceeds to a branch to No in the process of Step S15 and performs processing for comparison between the number of executed events (corresponding to a variable managed by the host CPU (24) and a playback initial value is "0") and the value of each accumulation counter 23*a* (S18).

When the count of the corresponding accumulation counter is larger that it, the host CPU performs event processing (S19) until the number of execution events becomes equal to a value designated by the corresponding accumulation counter. If the value of the number of execution events exceeds the count of the accumulation counter, then the host CPU terminates the interrupt processing.

When the synchronous message is processed in the sequencer processing of the firmware during the interrupt processing, and the accumulation counter 23*a* has been incremented (it corresponds to processing where synchronous events occur continuously in plural form), the event processing (S19) is executed in a manner similar to the above until the number of execution events and the value of the accumulation counter become equal to each other, without exit of the interrupt processing at the decision of Step (S18).

<Processing at the Playback at the Middle of Music (where Playback is Done from the Time Designated in the Middle of Music)>

In a manner similar to the normal playback, the firmware of the sequencer block 22 message-analyzes MIDI data of the FIFO memory 21 sequentially (S11). When a synchronous message is analyzed and processed at this time, the corresponding accumulation counter 23*a* is incremented by +1 (S12). Since the firmware is in seeking operation up to the playback start position at the middle of the music in this case (S13), it does not interrupt the host CPU (24) and continues to perform the sequencer processing as it is.

During the seek processing up to the playback start position in the middle of the music, the above processing is repeated and the number of synchronous messages processed up to the playback start position in the middle of the music is accumulated in the corresponding accumulation counter.

When the synchronous message is analyzed after the seeking operation up to the playback start position in the middle of the music has been ended and the reproduction thereof has been started (S11), the firmware increments the accumulation counter 23*a* by +1 (S12) and thereafter generates an interrupt request to the host CPU (24) (S14), followed by returning to the sequencer processing.

Since the first interrupt subsequent to the start of seek playback occurs on the host CPU side having accepted the interrupt request (S15), the host CPU performs the process of setting the value of the accumulation counter to the number of executed events (S16). And the host CPU performs event processing indicated by the value of the accumulation counter (S17). Subsequent processes are similar to the term <<Processing at the normal playback (where playback is done from the head of music)>.

In the present embodiment, as described above, the event processing is carried out until the value held in each of the accumulation counters 23*a* in the register 23 and the number of execution events counted by the host CPU (24) coincide with each other. It is therefore possible to prevent execution leakage of a synchronous interrupt at the host CPU and execute a synchronous event in sync with the performance of music. It is also possible to perform event processing free of the occurrence of the conventional shift in event timing.

Although the present embodiment has explained the case in which the FIFO memory is used as the MIDI input memory, the memory needs not use the FIFO memory. The memory may be a memory capable of inputting and holding music data. The method for inserting a synchronous message in MIDI music needs not to be limited in particular. As an alternative to the method, can be adopted, synchronization with a note on message of a given channel, e.g., substitution of a note on message of an unused note number therefor.

While the preferred form of the present invention has been described, it is to be understood that modifications will be apparent to those skilled in the art without departing from the spirit of the invention. The scope of the invention is to be determined solely by the following claims.

What is claimed is:

1. A MIDI playing method comprising the steps of:

analyzing MIDI data in order along a time series of the MIDI data where the MIDI data are analyzed from the head of music;

when synchronous even messages embedded in the MIDI data are detected during the analyzing step, accumulating the number of the synchronous event messages and requesting a host CPU to make interrupt processing;

executing synchronous event processing with the host CPU after the request for the interrupt processing until the number of executed synchronous events and the accumulated value coincide with each other; and when play messages embedded in the MIDI data are detected during the analyzing step, carrying out a musical performance.

2. The method of claim 1, further comprising the step of performing at least one event in response to the synchronous event processing by the CPU.

3. The method of claim 1, wherein the at least one event is selected from the group consisting of displaying at least one image, lighting an LED, and turning on a vibrator.

4. A MIDI playing method comprising the steps of:

analyzing MIDI data in order along a time series of the MIDI data where the MIDI data are analyzed from a playback position at the middle of music;

when synchronous event messages embedded in the MIDI data are detected during the analyzing step, accumulating the number of the synchronous event messages until a playback position in the middle of the music is reached;

when a corresponding synchronous event message is detected after the playback position at the middle of the music is reached, updating the accumulated number and thereafter requesting a host CPU to make an interrupt;

when the interrupt request corresponds to a first interrupt request subsequent to the attainment of a MIDI playback position to the playback position in the middle of the music, allowing the host CPU having accepted the interrupt request therein to set the accumulated value as the number of executed synchronous events, to execute synchronous events for turns corresponding to the number of the events, and, upon a subsequent interrupt request, to execute synchronous event processing until the number of the executed synchronous events and the accumulated value coincide with each other; and when play messages embedded in the MIDI data are detected during the analyzing step, carrying out a musical performance.

5. The method of claim 4, further comprising the step of performing at least one event in response to the synchronous event processing by the CPU.

6. The method of claim 5, wherein the at least one event is selected from the group consisting of displaying at least one image, lighting an LED, and turning on a vibrator.

* * * * *